(No Model.) 2 Sheets—Sheet 1.
J. F. FRALINGER.
ROUNDABOUT.
No. 472,212. Patented Apr. 5, 1892.
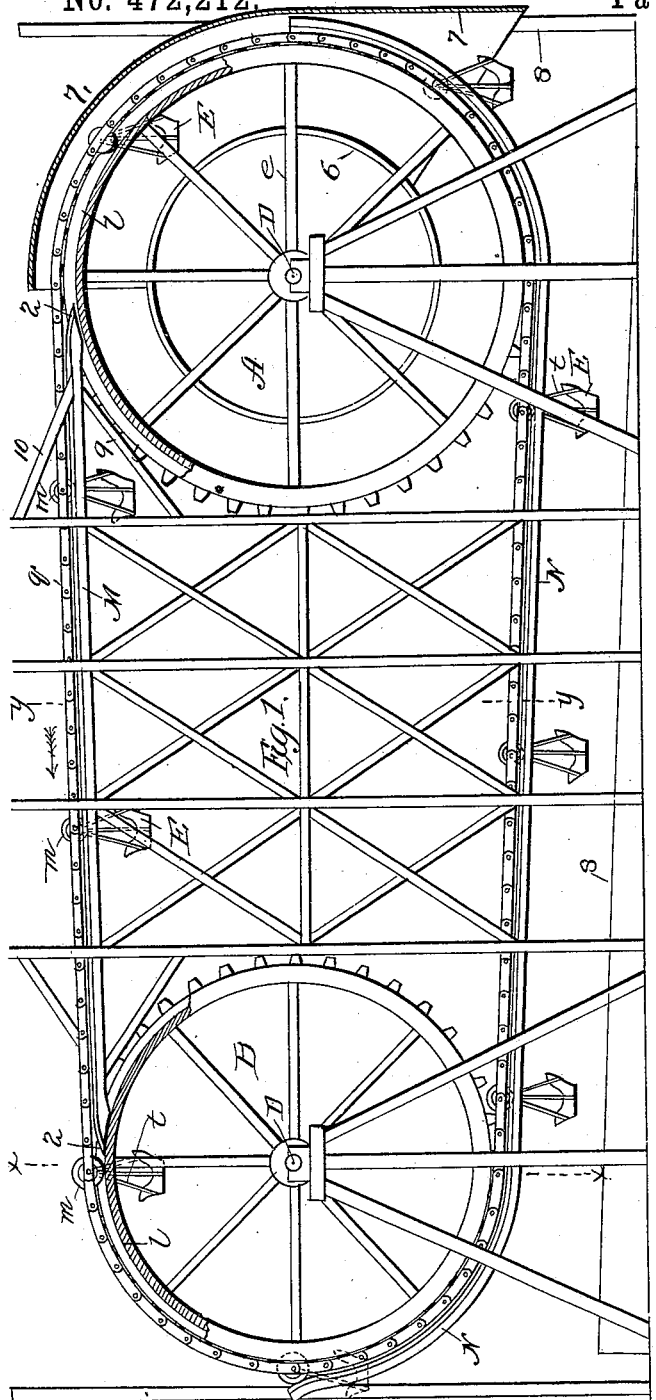
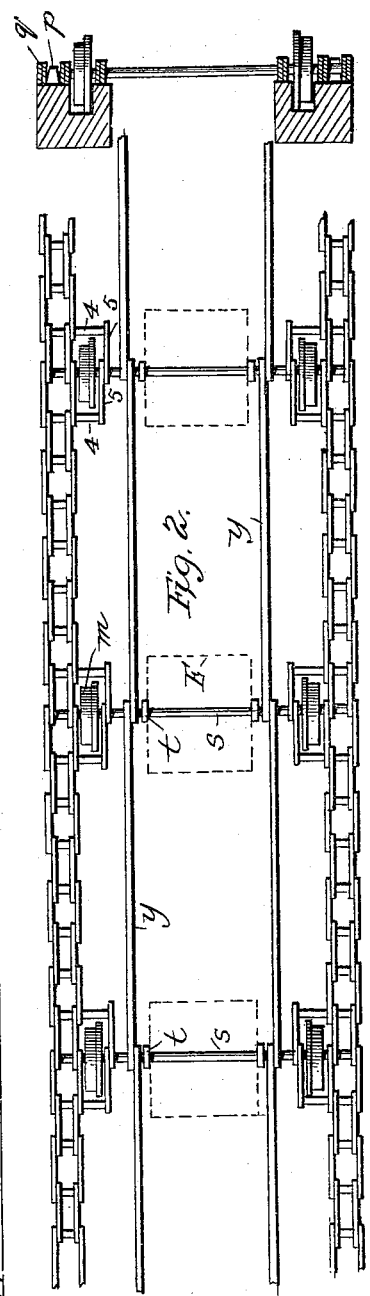
Inventor
Joseph F. Fralinger
by Ellis Spear
Atty.
Attest
Walter Donaldson
J. M. Spear (No Model.) 2 Sheets—Sheet 2.
J. F. FRALINGER.
ROUNDABOUT.
No. 472,212. Patented Apr. 5, 1892.
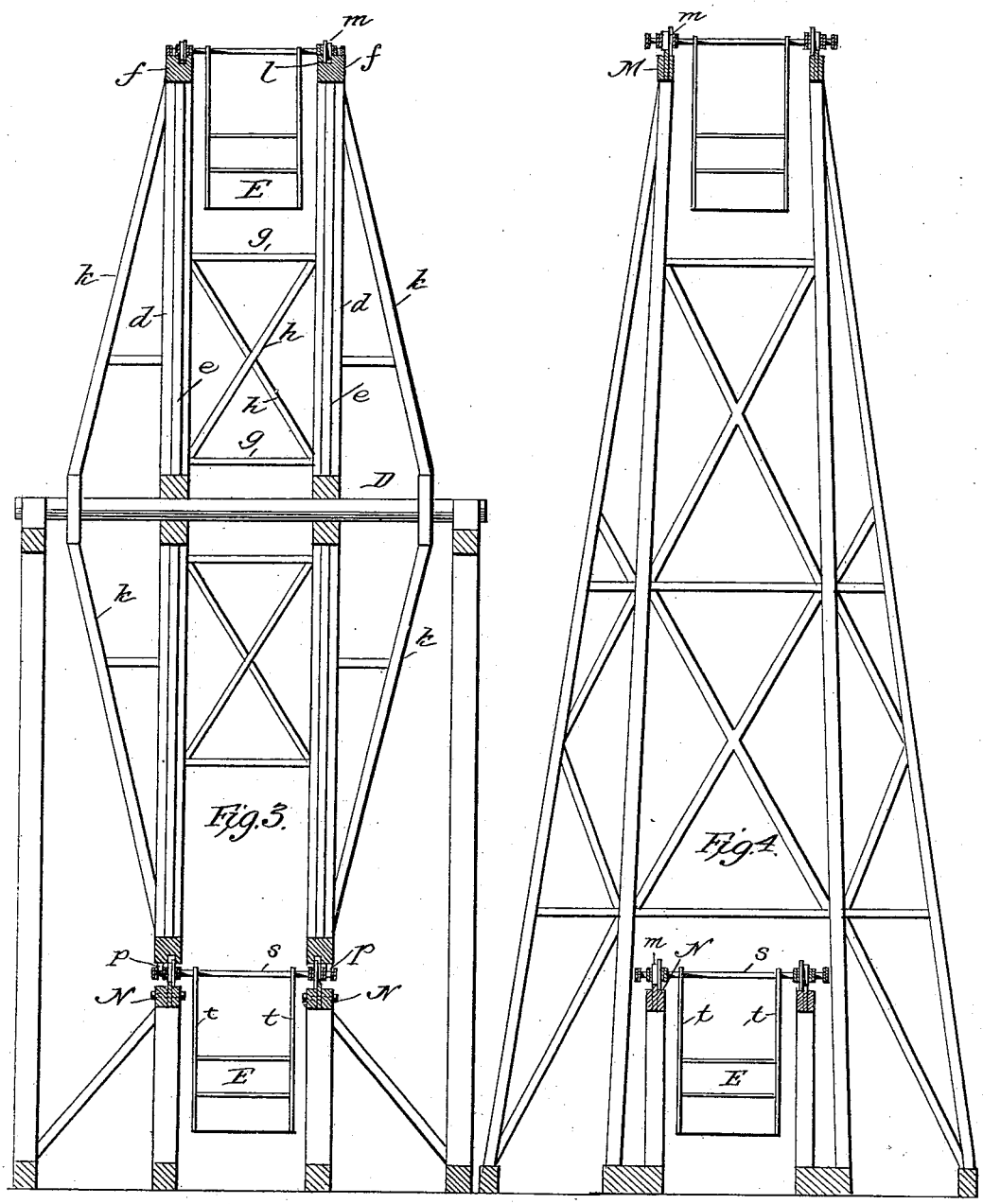

UNITED STATES PATENT OFFICE.

JOSEPH F. FRALINGER, OF ATLANTIC CITY, NEW JERSEY, ASSIGNOR OF ONE-HALF TO LOUIS A. HAINES, OF SAME PLACE.

ROUNDABOUT.

SPECIFICATION forming part of Letters Patent No. 472,212, dated April 5, 1892.

Application filed October 17, 1891. Serial No. 409,082. (No model.)

*To all whom it may concern:*

Be it known that I, JOSEPH F. FRALINGER, a citizen of the United States of America, residing at Atlantic City, in the county of Atlantic and State of New Jersey, have invented certain new and useful Improvements in Roundabouts, of which the following is a specification.

My invention is an improved form of roundabout or observation-railway, in which supporting and driving wheels are arranged in a vertical plane with intermediate elevated tracks and an endless-conveying-chain running over the tracks and around the wheels. It is illustrated in the accompanying drawings, in which—

Figure 1 shows the structure in side elevation. Fig. 2 shows the endless chain with trucks in plan view. Fig. 3 shows a section on line $x\ x$ of Fig. 1. Fig. 4 shows a section of Fig. 1 on line $y\ y$, these latter figures being on a larger scale.

In the drawings, A and B indicate the main wheels, to one or both of which the power may be applied in any well-known way. These wheels are supported upon trestles or framework, as shown in Fig. 1, the axles D of the wheels resting in bearings at each end.

Fig. 3 illustrates more clearly the construction of the wheels. Each wheel is made up of two side wheels $d$, each of which is composed of spokes $e$ and the rim $f$. The two side wheels are located upon the axles with an intervening space between for the chair E, the chair ordinarily being of sufficient width to accommodate two persons. The two side wheels are braced by cross-bars $g$ and diagonal struts $h$, as shown in Fig. 3, these being located nearer to the axle to leave the space nearer the periphery free for the passage of the seats. The wheels are further braced upon the axle by struts $k$. The peripheries of the rim are grooved and form sunken tracks $l$ for the wheels $m$ of the truck, these grooves being made nearer to the inner edge of the rim, leaving a plain bearing-surface between the grooves and the outside of the track on the periphery for the sprocket-chain. The wheels are alike in the respects above described, excepting that the wheel B is of less diameter than the wheel A, and as the bearings of both are in the same horizontal plane the tracks between the wheels above and below are inclined. The general form of the tracks M N is shown in the side elevation. They are supported upon the framework or trestles and extend substantially in a tangential direction to the wheels. The upper track M inclines from the periphery of the larger wheel to the periphery of the smaller wheel. The bearing-face of the track is in a cross-section, the same as that of the periphery of the wheel—that is to say, it has a groove near the inner edge in which the wheel of one end of the truck runs—and the broader bearing-surface between the groove and the outside of the track is for the passage of the chain. The ends 2 2 of the upper track are fitted to the periphery of the wheel, the bottom of the groove at the end being preferably provided with a tongue extending into the groove in the wheel, so that the wheel of the truck will ride from the main wheel onto the straight track or from the track to the other main wheel with ease and certainty. The seats or cars run in the direction of the arrow in Fig. 1—that is, on the downgrade—and they pass around the periphery of the wheel B, being supported on the wheel and kept in contact therewith by gravity down to the horizontal plane of the axles. At this point begins the lower track N, which curves to conform to the periphery of the wheel (one track being on each side) for about one-quarter of the periphery, whence it extends in a straight line and in a tangential direction underneath the larger wheel A, whence it curves up over about one-fourth the circumference of the said larger wheel. The space between the lower track and the periphery of the wheels B A is sufficient to admit the wheels of the truck, as shown in Fig. 3. The trucks are supported on the tracks N during their passage over the greater part of said tracks, the curved ends of said tracks N serving also to hold the truck-wheels to the main wheels A B. The lower tracks are sufficiently elevated, as shown in Figs. 3 and 4, to leave a sufficient space for the seats or cars E. The wheels A B are provided with sprocket-teeth $p$ on the peripheries fitted to the sprocket-chains $g$, so that the chains are securely held to both wheels. I have shown the car in which the persons riding are carried as simple suspending seats without limiting myself to the shape or design. As shown, they are supported upon axles $s$ by means of arms $t$, the upper ends of which are pivoted upon the axles, the truck-wheels $m$ being upon the outer ends of these axles. Outside of the truck-wheels the axles extend into the chain where they form the pivotal connections between the links. For greater security I extend the link-pivots 4 of the chain next to the truck-wheel in front and rear, and connect them to the axle by supplemental links 5, so as to form a box for the wheel and very secure connections between the wheels and the chain.

To give greater variety to the ride, I provide a tunnel or covered way in connection with one of the main wheels. This is shown in connection with the wheel A. In this wheel is a circular wall 6, extending from one side to the other and covering the space between the two side wheels $d\,d$. It may be sustained by the cross-bars $g$. The sides of the wheel between the wall 6 and the periphery of the wheel are covered and outside the wheel is also a covering curved above to conform to the periphery of the wheel and marked 7. The side covering extends at the bottom out to the vertical posts, as shown at 8. These posts sustain, also, the covering 7, and this leaves space for the seats to pass into a vertical position, which they always maintain. All the lifting is done between the lower part and upper part of the larger wheel, the chain passing in the direction of the arrow in Fig. 1, and I prefer to apply the power to the larger wheel. I have also shown in Fig. 1 the platform $8^\times$, underneath the lower track, on which the persons may stand to take the seats. A very large number of seats may be carried on these tracks and several seats may be filled or emptied at the same time.

I do not confine myself to the specific construction of the frame-work between the wheels. In the form shown this frame-work supports the track and with this intermediate frame-work it is necessary to sustain firmly the ends of the track next to the wheels, this being done, as shown, by the brace 9 and the tie 10.

In order to provide against accident in case of rupture of any of the links of the sprocket-chain, I provide a series of safety-bars $y$, jointed at $y'$, which extend from axle to axle, as shown in Fig. 2, and in case of rupture of the chain the bar at the break will prevent the chain from separating.

I claim as my invention—

1. In combination, the vertical wheels with the intermediate tracks, the endless chain, and the trucks which the wheels and the track are adapted to carry, and seats or cars suspended from said trucks, all substantially as described.

2. The wheels A and B, one of greater diameter than the other, mounted upon bearings in the same horizontal plane, the inclined tracks above and below between said wheels, the wheels and the track being fitted to carry trucks and a connecting-chain, and cars or seats suspended from said trucks or chains and arranged to run upon the tracks and the wheels, the parts being combined and operating substantially as described.

3. In combination with the wheels, the intermediate tracks, the trucks, the cars, and the endless chain, the covered way or tunnel, substantially as described.

4. In combination, a sprocket, the chain carrying the cars or seats, and the safety-bars, substantially as described.

In testimony whereof I affix my signature in presence of two witnesses.

JOSEPH F. FRALINGER.

Witnesses:
ALLEN B. ENDICOTT,
H. F. COGILL.